United States Patent
Zhu et al.

(10) Patent No.: US 8,576,961 B1
(45) Date of Patent: Nov. 5, 2013

(54) SYSTEM AND METHOD FOR ADAPTIVE OVERLAP AND ADD LENGTH ESTIMATION

(75) Inventors: Haidong Zhu, San Diego, CA (US); Dumitru Mihai Ionescu, San Diego, CA (US); Abu Amanullah, San Diego, CA (US)

(73) Assignee: Olympus Corporation, Tokyo (JP)

( * ) Notice: Subject to any disclaimer, the term of this patent is extended or adjusted under 35 U.S.C. 154(b) by 653 days.

(21) Appl. No.: 12/484,893

(22) Filed: Jun. 15, 2009

(51) Int. Cl.
  *H04L 27/06* (2006.01)
(52) U.S. Cl.
  USPC ........... 375/343; 375/260; 375/316; 375/340; 375/348; 375/354; 375/355; 375/371; 370/210; 370/480; 370/503; 370/508; 370/509; 370/510; 370/511; 370/512; 370/513; 370/514; 704/216; 704/218; 704/237; 704/263; 704/267; 341/173; 341/180; 455/502; 327/141; 714/707
(58) Field of Classification Search
  USPC ......... 375/260, 316, 340, 343, 348, 354, 355, 375/371; 370/210, 480, 503, 508, 509, 510, 370/511, 512, 513, 514; 341/173, 180; 455/502; 704/216, 218, 237, 263, 267; 327/141; 714/707
  See application file for complete search history.

(56) References Cited

U.S. PATENT DOCUMENTS

| | | | |
|---|---|---|---|
| 5,473,759 A | 12/1995 | Slaney et al. | |
| 7,965,798 B2 * | 6/2011 | Roh et al. | 375/343 |
| 8,050,348 B2 * | 11/2011 | Kim et al. | 375/267 |
| 2006/0159189 A1 * | 7/2006 | Balakrishnan et al. | 375/260 |
| 2006/0256883 A1 | 11/2006 | Yonge et al. | |
| 2007/0058738 A1 | 3/2007 | Mahadevappa et al. | |
| 2007/0171993 A1 | 7/2007 | Lai | |
| 2008/0310565 A1 * | 12/2008 | Abbott et al. | 375/348 |

OTHER PUBLICATIONS

D. Lowe and X. Huang, Adaptive Overlap-Add Equalization for MB-OFDM Ultra-Wideband. 2006 International Symposium on Communications and Information Technologies (ISCIT), Bangkok, Thailand, Oct. 18-20, 2006.

June Chul Roh, Anuj Batra and Deric Waters, Adaptive Overlap-and-Add Techniques for MB-OFDM Systems. Signals, Systems and Computers. IEEE, Nov. 2007, pp. 1331-1335.

* cited by examiner

*Primary Examiner* — Leon Flores
(74) *Attorney, Agent, or Firm* — Sheppard Mullin Richter & Hampton LLP (57) ABSTRACT

A method for determining an overlap and add length estimate comprises determining a plurality of correlation values of a plurality of ordered frequency domain samples obtained from a data frame; comparing the correlation values of a first subset of the samples to a first predetermined threshold to determine a first edge sample; comparing the correlation values of a second subset of the samples to a second predetermined threshold to determine a second edge sample; using the first and second edge samples to determine an overlap and add length estimate; and providing the overlap and add length estimate to an overlap and add circuit.

16 Claims, 10 Drawing Sheets

SYSTEM AND METHOD FOR ADAPTIVE OVERLAP AND ADD LENGTH ESTIMATION

TECHNICAL FIELD

The present invention relates generally to communication networks, and more particularly, some embodiments relate to adaptive overlap and add length estimation and zero padded OFDM communications systems.

DESCRIPTION OF THE RELATED ART

In multicarrier systems, data symbols are transmitted in parallel on N different carriers. Compared with single carrier systems transmitting at the same symbol rate, multicarrier systems extend the length of a symbol by a factor of N. Dispersion of the channel frequently causes intersymbol interference between sequential multicarrier symbols. To reduce the effect of intersymbol interference, guard intervals may be used to extend the distance between the symbols. When the length of a guard interval is longer than the duration of the channel impulse response, the intersymbol interference effect may be avoided completely.

In zero padded communications systems, a plurality of zeros are added to the data part of each symbol to act as the guard interval. For example, in the WiMedia PHY specification based on multiband OFDM communications, 37 zeros are added after the data part of each OFDM symbol. At the receiver, in order to retain the circular convolution property, a collection of the guard samples need to be added back to the head of the data part of the symbol. This method is called overlap and add (OLA), and the number of guard interval samples added to the data part is termed the OLA length. When the memory of the channel is less than the OLA length some additional samples that contain pure noise are added back to the original data symbol, decreasing the signal-to-noise ratio at the discrete Fourier transform output.

BRIEF SUMMARY OF EMBODIMENTS OF THE INVENTION

According to various embodiments of the invention an adaptive overlap and add length is determined using edge detection on a crosscorrelation dataset between a received training sequence and a locally stored training sequence. Autocorrelation is used to determine a rough time estimate and crosscorrelation is used to refine the rough estimate and determine an adaptive OLA length corresponding to the channel memory.

According to an embodiment of the invention, a method for determining an overlap and add length estimate comprises determining a plurality of correlation values of a plurality of ordered frequency domain samples obtained from a data frame; comparing the correlation values of a first subset of the samples to a first predetermined threshold to determine a first edge sample; comparing the correlation values of a second subset of the samples to a second predetermined threshold to determine a second edge sample; using the first and second edge samples to determine an overlap and add length estimate; and providing the overlap and add length estimate to an overlap and add circuit.

According to a further embodiment of the invention, an apparatus for receiving a data transmission, comprises a correlation module configured to determine a plurality of correlation values of a plurality of ordered frequency domain samples obtained from a data frame; and an overlap and add circuit configured to perform overlap and add on a received signal according to a determine the overlap and add length; wherein the apparatus is configured to compare the correlation values of a first subset of the samples to a first predetermined threshold to determine a first edge sample; compare the correlation values of a second subset of the samples to a second predetermined threshold to determine a second edge sample; use the first and second edge samples to determine an overlap and add length estimate; and provide the overlap and add length estimate to the overlap and add circuit.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 10:
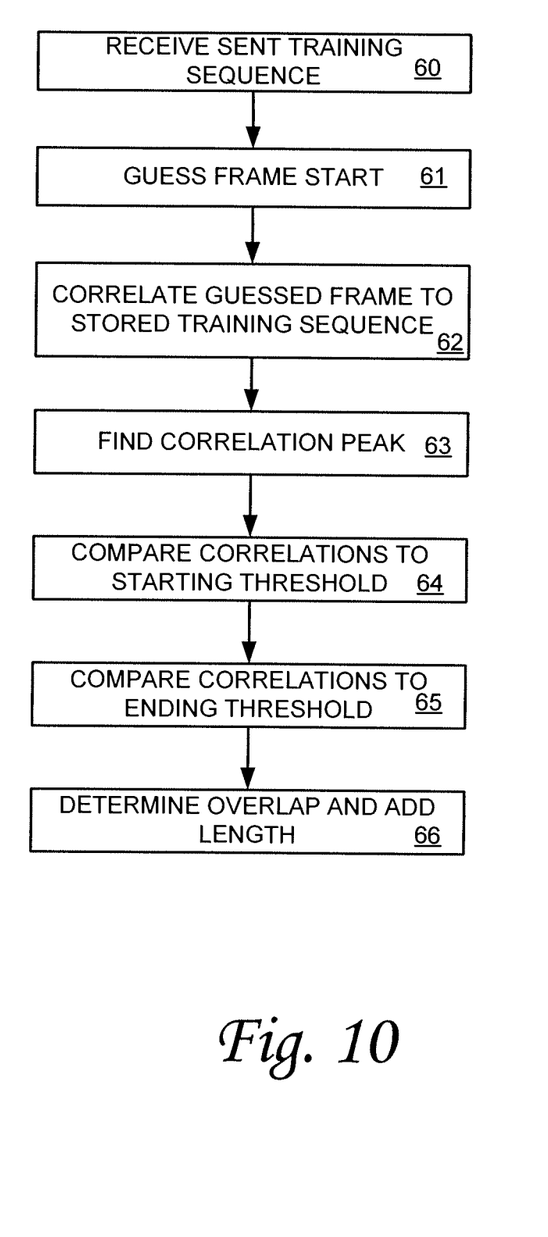
FIG. 10 illustrates a flowchart describing an embodiment of the invention.

FIG. 10 is a flowchart illustrating some embodiments of the invention. The receiving device receives a training sequence sent by a sending device 60 to allow communications between the sending and receiving device. The receiving device guesses a frame start of the received training sequence 61, for example by autocorrelation of the sixth received training sequence. Then, the receiving device correlates the received training sequence to a stored copy of the training sequence 62 at a plurality of different offset values. The receiving device and then inspects the correlation values to find the offset with the peak correlation value 63. The receiving device then determines a first edge offset sample value by comparing samples arriving before the peak correlation sample to a first threshold 64. A second or channel edge offset sample is determined by comparing samples arriving after the peak correlation sample to a second threshold 65. A fine timing estimate is determined according to the first edge sample, and the overlap and add length 66 is determined by the distance between the first edge sample and the second edge sample.

Figure 1A:
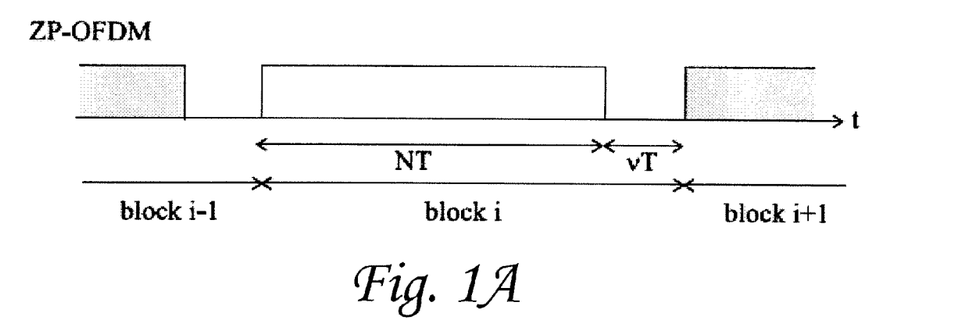
FIG. 1A illustrates a transmitted data signal according to an embodiment of the invention.
Figure 1B:
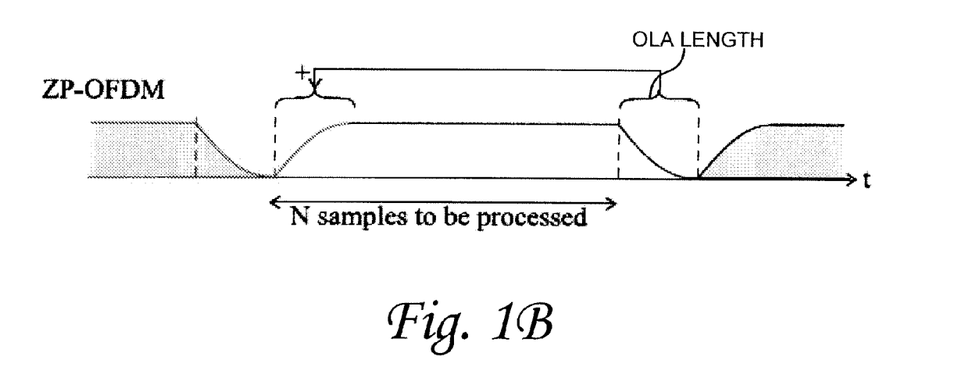
FIG. 1B illustrates a received data signal showing the effects of a channel impulse response according to an embodiment of the invention.

Before describing the invention in detail, it is useful to describe an example environment with which the invention can be implemented. One such example is that of a multiband OFDM communication system. A particular example is an OFDM system where a number of zero samples are added after the data part of a transmitted OFDM symbol as a guard interval to avoid inter-symbol interference. To retain the circular convolution property the receiver implements overlap and add (OLA) to add a collection of the guard samples to the head of the data part of the OFDM symbol (or the tail if the zero samples are added before data part of the transmitted OFDM symbol). FIG. 1A illustrates such a zero padded transmitted OFDM symbol, wherein the data part of OFDM symbol block i comprises N samples and the zero padded part of block i comprises v samples. FIG. 1B illustrates such a OLA process where an OLA length of samples is added to the header of the N samples to be processed.

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

In some embodiments, an adaptive OLA length may be determined using cross correlation between a received sequence and a local copy of the same sequence. For example, an adaptive OLA length may be determined during synchronization between a transmitter and a receiver using a predefined training sequence known to both the transmitter and receiver. Such a training sequence t(n) is sent by a transmitter and received by the receiver, which compares the received training sequence to the locally stored training sequence. At the receiver, the received training sequence may be represented as $$r(n) = \sum_{k=0}^{L-1} t(n-k-n_0)h_k(n) + w(n) \quad (1)$$

where w(n) is additive white Gaussian noise (AWGN) with invariance $N_0$, where $h_k(n)$ is the kth channel tap of the finite channel impulse response h(n) with memory size L, and $n_0$ is an unknown timing offset. The synchronization process determines the $n_0$ before the end of the packet preamble, and allows the timing of the packet to be realigned for further DFT processing.

In some embodiments, a training sequence may be determined according to the channel used and may comprise a predetermined training sequence having a predetermined number of samples. For example, in the WiMedia PHY specification, the training sequences $t_i(n)$ for each channel $TFC_i$ are 128 samples long. In embodiments where the training sequence t(n) has ideal autocorrelation, $$\phi_{tt}(m) = \sum_{n=0}^{127} t(n+m)t(n)^* = \delta(m), \quad (2)$$

where δ(m) is the Kronecker delta, then the cross-correlation between the transmitted and received signals will be $$\phi_{rt}(m) = \sum_{n=0}^{127} r(n+m)t(n)^* = h(m-n_0) + \sum_{n=0}^{127} w(n+m)t(n)^*. \quad (3)$$

In embodiments where the training sequences do not have ideal autocorrelation, the effects of the non-zero side lobes of the autocorrelation function may be taken into account in Eq. (3). However, even in these embodiments, the effects of the nonzero side lobes may not affect the mathematical treatment if the peak energy of the autocorrelation function is sufficiently larger than the energy of the first side lobe. For example, in the WiMedia PHY specification, the peak energy of $\phi_{t_i t_i}(0)$ of the training sequences $t_i(n)$ is more than 20 dB higher than the most significant side lobe. Accordingly, for the sake of simplicity, the example embodiments described herein ignore the effects of nonzero side lobes in the autocorrelation function.

According to some embodiments of the invention, the adaptive OLA length corresponds to estimation of the length, $\hat{L}$, of the channel impulse response (CIR), h(n). In an OLA operation, the first $\hat{L}$ samples in the guard interval are added back to the head of the data part of the current OFDM symbol. For example, if the current OFDM symbol comprises a received sequence, r(n), from sample n=T to n=T+164, the kth DFT output of the symbol is given by $$y(k) = \frac{1}{\sqrt{128}} \sum_{l=0}^{127} \bar{r}(T+l)e^{j2\pi kl/128}, \quad (4)$$

where $$\bar{r}(n) = \begin{cases} r(n) + r(n+127), & n \in [T, T+\hat{L}-1]; \\ r(n), & n \in [T+\hat{L}, T+127]. \end{cases} \quad (5)$$

As illustrated by Eqs. (4) and (5), adaptive OLA may be performed by estimating two parameters: the OLA length $\hat{L}$, and the starting position T.

Figure 2:
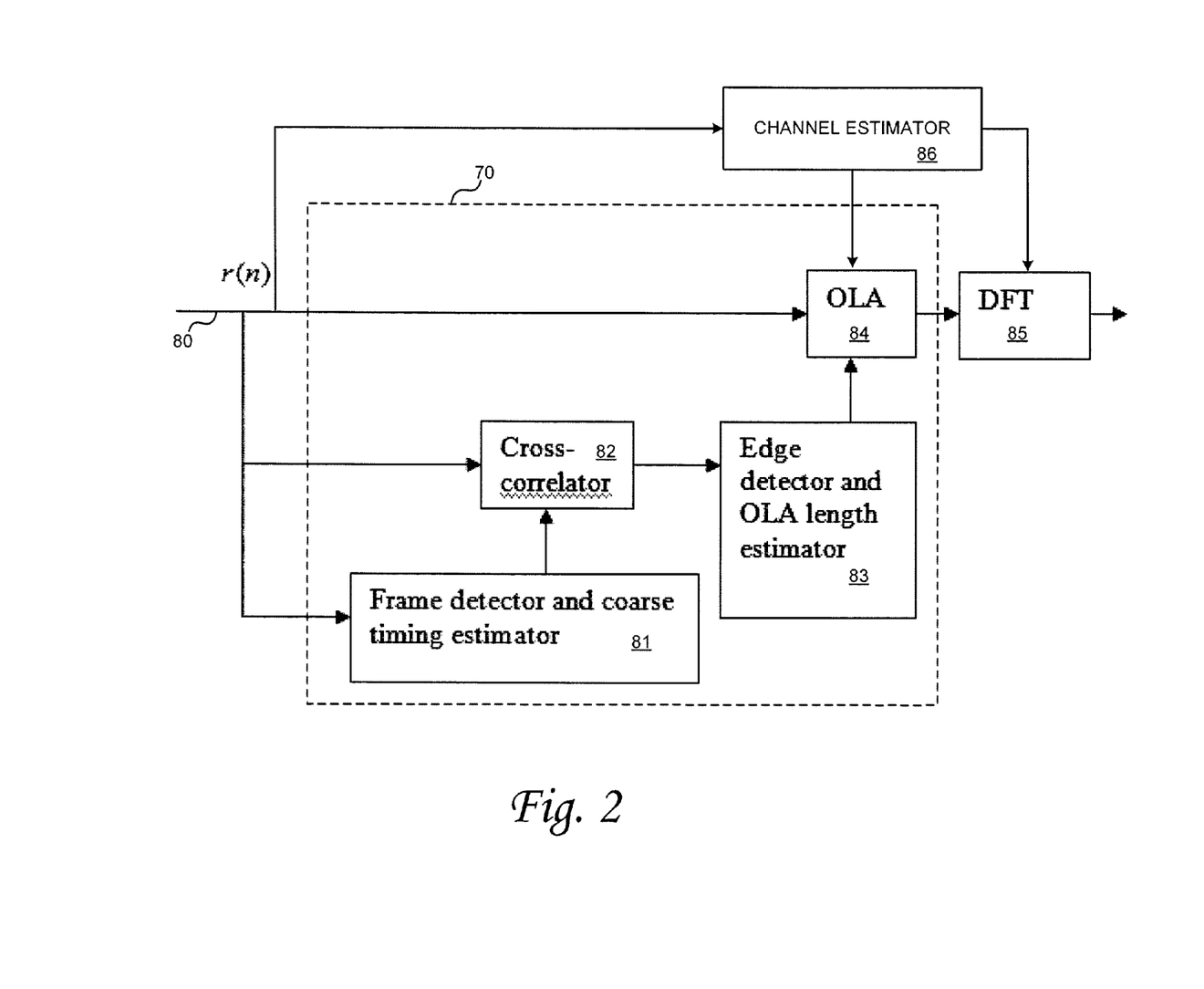
FIG. 2 illustrates an adaptive OLA module according to an embodiment of the invention.
Figure 3A:
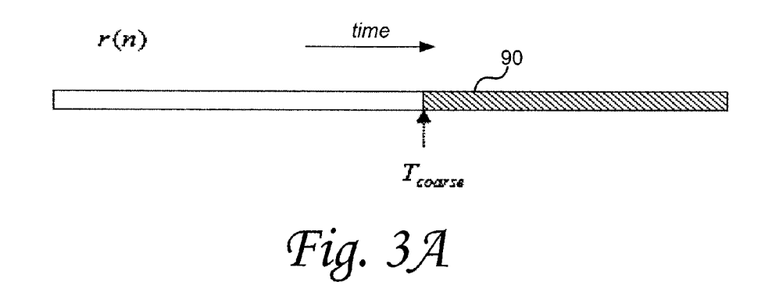
FIG. 3A illustrates a coarse timing estimate according to an embodiment of the invention.

FIG. 2 illustrates an adaptive OLA module according to an embodiment of the invention. Adaptive OLA module 70 is configured to receive a signal r(n) 80 and to present the signal to the frame detector and coarse timing estimator module 81, the cross correlator module 82, and the OLA module 84. As diagrammed in FIG. 3A, the frame detector and coarse timing estimator module 81 detects the presence of a transmitted data packet 90 within the received signal r(n) 80. The frame detector and coarse timing estimator module 81 further synchronizes the frame boundary and roughly estimates the starting point of the packet and provides an estimated starting point, referred to herein as $T_{coarse}$. For example, such a frame detector and coarse timing estimator module may comprise a delayed-autocorrelation estimator.

Figure 3B:
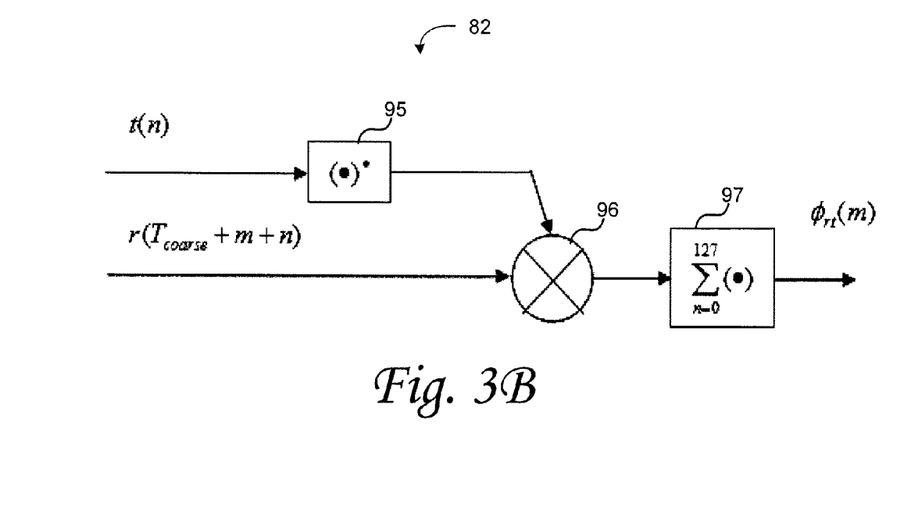
FIG. 3B illustrates a cross correlator according to an embodiment of the invention.

Cross correlator 82 uses the rough timing estimate to implement cross correlation between the received digital samples and the pre-stored training sequence t(n). For example, in an embodiment where channel estimation is conducted using a 128 sample training sequence, cross correlation may be implemented as $$\phi_{rt}(m) = \sum_{n=0}^{127} r(T_{coarse} + m + n)t(n)^*, \quad (6)$$

this cross correlation may be performed at for a number of different sample offsets, m. In various embodiments, m may be determined according to computational resource availability and maximizing the number of samples that are inspected for cross correlation. In a particular embodiment employing a 128 sample length training sequence, the offset m is selected from the range [−90, 90]. FIG. 3B illustrates such a cross correlator 82 according to an embodiment of the invention. The training sequence t(n) conjugated by module 95 and multiplied symbol by symbol with the symbols of the received signal r($T_{coarse}$+m+n) at module 96. Module 97 adds the multiplied symbols for n=0 to n=127 to determine $\phi_{rt}(m)$ for a particular offset m. Edge detector and OLA length estimator module 83 determines a further timing estimate and an adaptive OLA length estimate based on the data from the cross correlator module 82.

In further embodiments, a channel estimation module 86 may be provided to allow the overlap and add function to be performed selectively based on channel properties. Channel estimation module 86 is configured to determine if the channel is a fading channel, and to bypass the OLA circuit 84 if the channel is not a fading. For example, channel estimation module 86 may estimate the channel properties through autocorrelation of a channel estimation sequence sent subsequent to the training sequence. If the channel estimation module 86 determines that the channel is not a fading, the channel estimation module may bypass the OLA circuit 84 and cause subsequent data transmissions to be provided directly to the DFT module 85.

Figure 4:
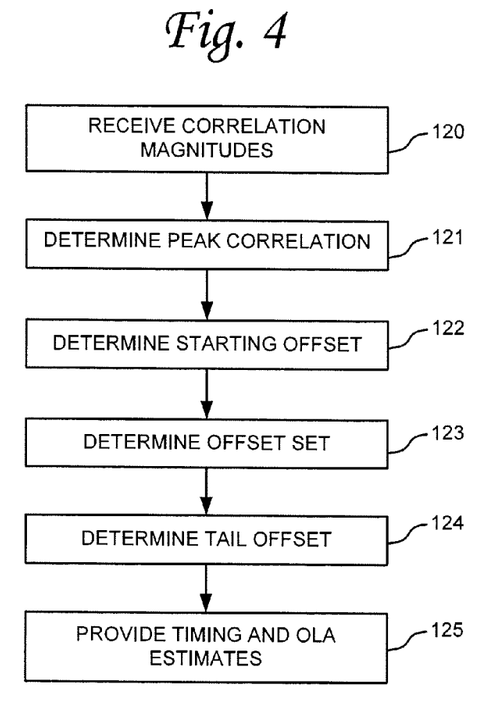
FIG. 4 illustrates a method of timing an adaptive OLA length estimation according to an embodiment of the invention.
Figure 5:
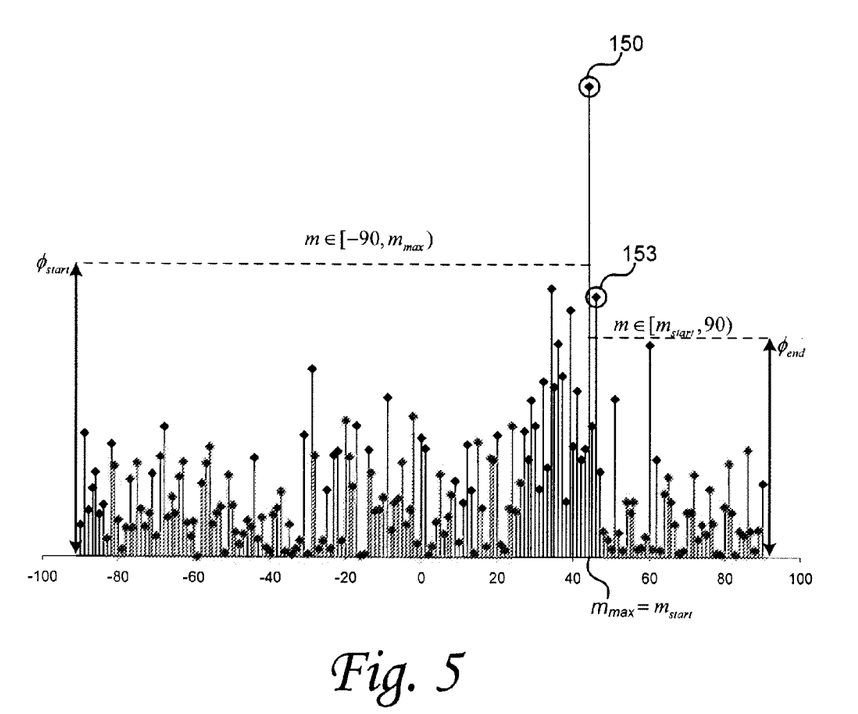
FIGS. 5-8 illustrate various crosscorrelation dataset and thresholds used for timing and length estimation according to embodiments of the invention.
Figure 6:
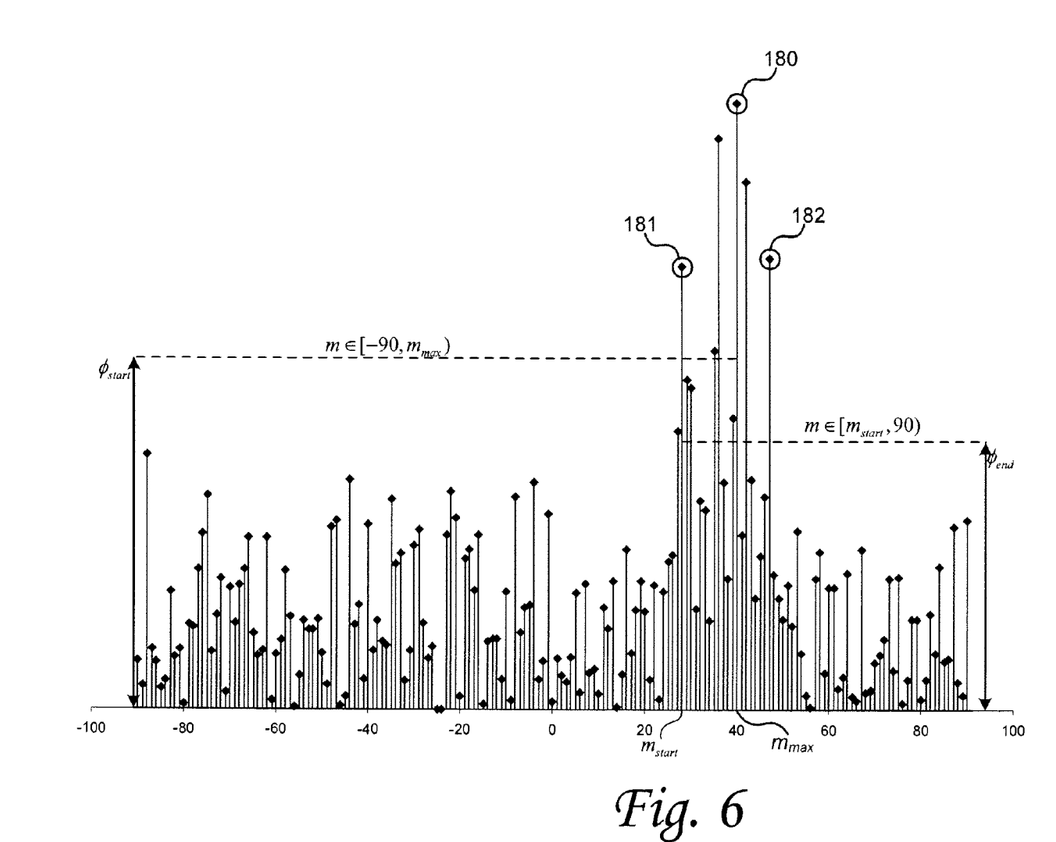
Figure 7:
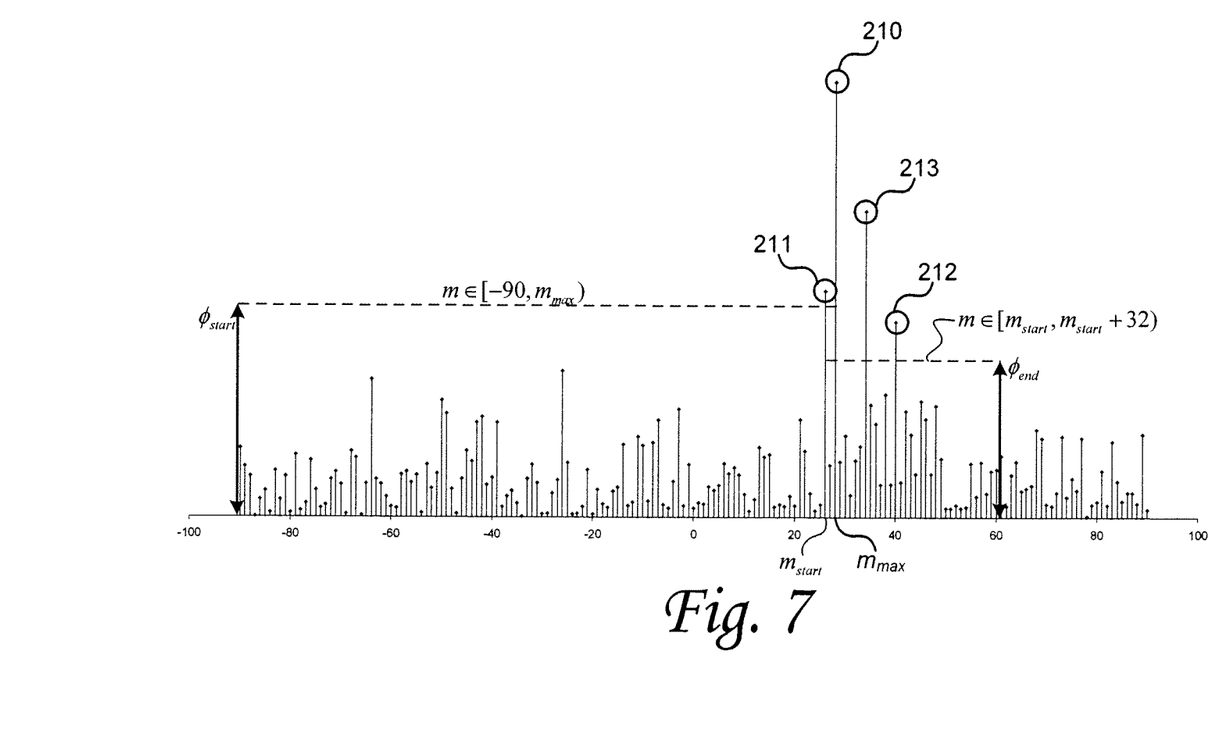

FIG. 4 illustrates a method implemented by a detector and of a length estimator module 83 according to an embodiment of the invention. FIGS. 5, 6, and 7 illustrate example correlation data for use in explaining the method of FIG. 4. In step 120, module 83 receives the correlation data from cross correlator module 82. In step 121, the peak correlation value $\phi_{max}$ and its corresponding offset $m_{max}$. For example, in the embodiment employing a offset range m∈[−90,90], $m_{max}$=arg max|$\phi_{rt}(m)$|∀m∈[−90,90], $\phi_{max}$=|$\phi_{rt}(m_{max})$|. (7)

In the example correlation datasets of FIGS. 5, 6, and 7, these peak correlation points are illustrated by reference numbers 150, 180, and 210, respectively.

In step 122, the module determines the starting offset for use in determining the further timing estimate and the adaptive OLA length. In some embodiments, this step comprises examining the magnitude of the correlation values for the samples in the range m∈[−90,$m_{max}$) to determine the first sample, $m_{start}$, whose correlation value is greater than a first predetermined threshold $\phi_{start}$, illustrated as points 181, and 211. Various embodiments may employ different methods for determining $\phi_{start}$, such as according to a function of $\phi_{max}$ or as a predetermined correlation value. For example, in a particular embodiment, $$\phi_{start} = \frac{\phi_{max}}{2}.$$

If there is no point in the range m∈[−90, $m_{max}$) greater than the first predetermined threshold, then various embodiments may imply different methods for determining $m_{start}$. For example, the data range may be re-examined according to a second choice of $\phi_{start}$, or a predetermined default value of $m_{start}$ may be employed. In a particular example, if there is no sample in the range m∈[−90,$m_{max}$) such that $\phi_{rt}(m)$>$\phi_{start}$, then $m_{start}$ is set as $m_{max}$, as illustrated in FIG. 5.

In some embodiments, the step of determining the adaptive OLA length estimate further comprises step 123 of determining an offset set for use in determining a ending offset $m_{end}$ for the OLA length estimate. In some embodiments, the members of the set are determined according to a second predetermined threshold $\phi_{end}$. For example, the samples in the range m∈[$m_{start}$,$m_{start}$+p) are examined according to the threshold $\phi_{end}$, where p might vary according to embodiments. For example, in the embodiment illustrated by FIG. 7, a default OLA length is 32 samples. Accordingly, to improve performance the adaptive OLA length is less than 32 samples and p=32 so that the samples in the range m∈[$m_{start}$, $m_{start}$+32) are examined. In other embodiments, for example those illustrated by FIGS. 5 and 6, the range for determining $m_{end}$ is selected in a similar fashion to the range used to determine $m_{start}$, such as m∈[$m_{start}$,90). In these embodiments, the samples within the predetermined range whose correlation value magnitudes are greater than $\phi_{end}$ are recorded into the set. For example, the set corresponding to FIG. 5 has 2 elements; the set corresponding to FIG. 6 has 9 elements; and the set corresponding to FIG. 7 has 4 elements.

In step 124, the end sample offset is determined using the results of step 123. The end sample offset, $m_{end}$, is compared to $m_{start}$ to determine the adaptive OLA length. Various rules and metrics may be determined according to the environment in which the embodiment is deployed. In some embodiments, the adaptive OLA methods described herein may achieve noise reduction over fixed OLA length methods in a fading channel. However, in an additive white Gaussian noise channel (AWGN), the adaptive OLA methods may provide reduced improvements or may have a detrimental effect on performance. As described herein, a channel estimator may be employed to avoid performing adaptive OLA in a non-fading channel. In an AWGN channel, the channel estimator will typically observe a single autocorrelation spike having an autocorrelation magnitude greater than a predetermined channel estimation threshold. However in some instances, the random nature of AWGN and thermal noise present in the receiving hardware can result in additional autocorrelation spikes causing a false alarm where the AWGN channel appears to be a fading channel. These false alarm cases will often manifest in the cross correlation results as sample offsets having a high cross correlation magnitude but occurring a certain distance away from $m_{max}$. Accordingly, in some embodiments, false alarm mitigation procedures may be performed to prevent these false alarm offsets from impacting the adaptive OLA length estimate.

One such false alarm mitigation procedure developed for data transmission in systems employing the WiMedia PHY specification is as follows, where $m_{tail}$ represents the largest offset in the array, and $m_{total}$ represents the number of elements in the set:

If $m_{tail}$−$m_{start}$≤4 then $m_{end}$=$m_{tail}$. (1.)

If $m_{tail}-m_{start}>4$ and $m_{total}\geq 5$ then $m_{end}=m_{tail}$. (2.)

If $m_{tail}-m_{start}>4$ and $m_{total}<5$ then $m_{end}=m_{tail-1}$, (3.)

where $m_{tail-1}$ is the penultimate member of the set. FIG. 5 illustrates the first case, where $m_{start}$ is the sample of point 150 and $m_{tail}$ is the sample of point 153. In this case, $m_{tail}-m_{start}=2$ so $m_{end}$ is set as the sample of point 153. FIG. 6 illustrates the second case, where $m_{start}$ is the sample of point 181 and $m_{tail}$ is the sample of point. In this case, there are nine points in the set, so $m_{end}=m_{tail}$ and $m_{end}$ is set as the sample of point 182. FIG. 7 illustrates the third case, where $m_{start}$ is a sample of point 211 and $m_{tail}$ is the sample point 212. In this case, there are four points in the set, so the penultimate member of the set, the sample of point 213, is set as $m_{end}$.

Figure 8:
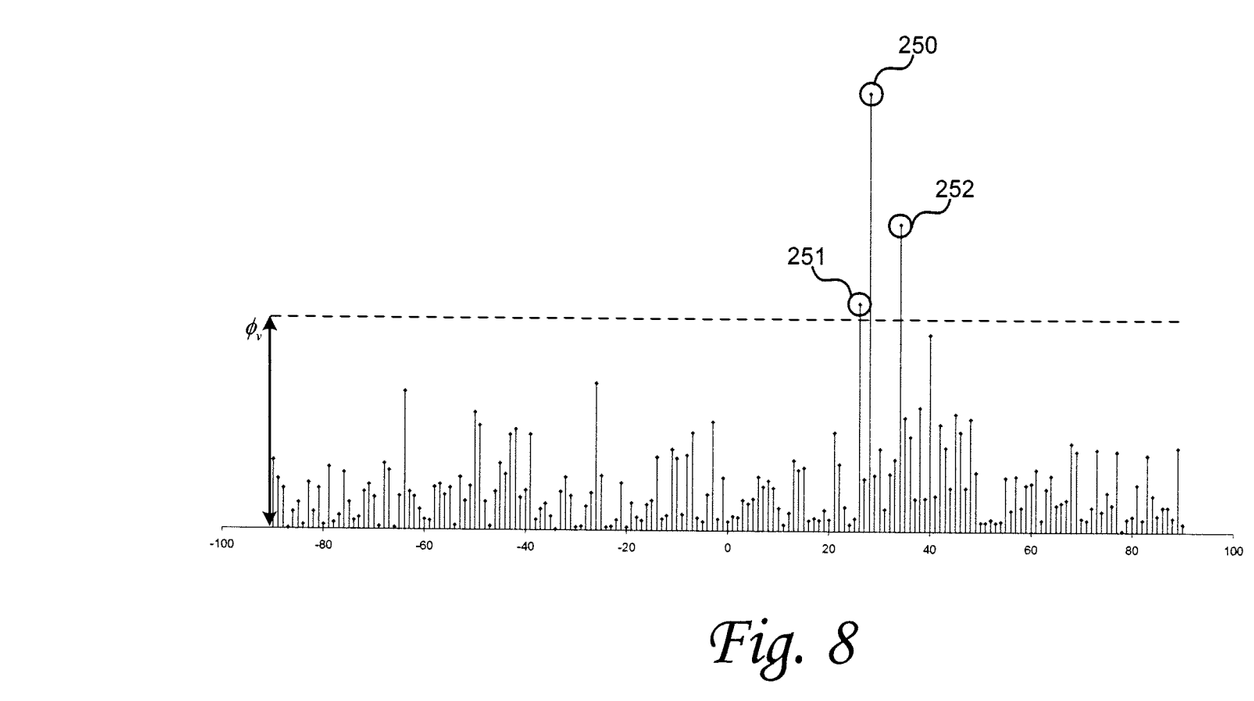

FIG. 8 illustrates another method of determining a timing adjustment an adaptive OLA length according to another embodiment of the invention. In this embodiment, a sample having a maximum correlation value, point 250 is determined, for example as described herein. Next, a starting offset $m_{start}$, 251, and endpoint $m_{end}$, 252, for an adaptive OLA value are determined simultaneously by comparing the correlation data to a single threshold $\phi_v$.

Referring again to FIGS. 2 and 4, in step 125 edge detector and OLA length estimator module 83 provide an updated timing estimate and an adaptive OLA length estimate to OLA module 84. The updated timing estimate comprises the previously determined sample offset $T_{coarse}$ plus the determined starting offset $m_{start}$, $$T=T_{coarse}+m_{start} \quad (8)$$

the OLA length estimate comprises the sample difference between $m_{end}$ and $m_{start}$, $$\hat{L}=m_{end}-m_{start} \quad (9)$$

OLA module 84 implements adaptive overlap and add using the received signal 80 and the refined timing estimate and OLA length estimate, for example using the method described with regard to Eq. (5). OA module 84 then provide the overlap and added signal to discrete Fourier transform module 85 for signal decoding.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 300. After reading this description, it will become apparent to a person skilled in the relevant art how to implement the invention using other computing modules or architectures.

Figure 9:
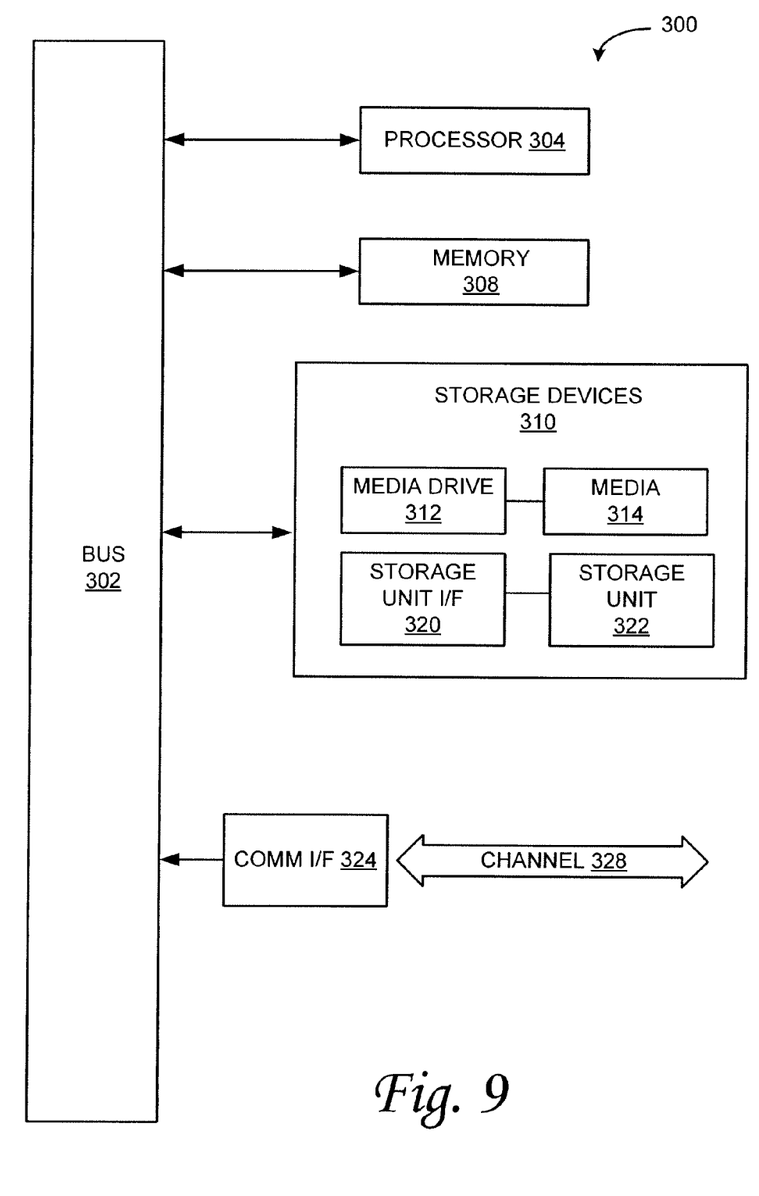
FIG. 9 illustrates an example computing module with which various features of embodiments of the invention may be implemented.

Referring now to FIG. 9, computing module 300 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314 might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and signals on channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for windowing time domain data samples derived from a data frame comprising:
   obtaining a plurality of time domain samples of a transmitted instance of a synchronization data frame;
   obtaining a coarse estimate of a starting value for the synchronization data frame;
   correlating the time domain samples of the transmitted instance with a locally stored instance of the synchronization data frame at a plurality of time value offsets to determine a corresponding plurality of magnitudes of correlation values;
   comparing the magnitudes of the correlation values corresponding to a first subset of the offsets to a first predetermined threshold to determine a first edge offset;

comparing the magnitudes of the correlation values corresponding to a second subset of the offsets to a second predetermined threshold to determine a set of potential second edge offsets;

selecting a second edge offset from the set of potential second edge offsets using a false alarm mitigation procedure;

using the first and second edge offsets to determine an overlap and add length estimate;

using the first edge offset to modify the coarse estimate of the starting value to determine an estimate of a starting position of a time-domain data window for subsequent processing by an overlap-and-add circuit; and providing the starting position estimate and the overlap and add length estimate to the overlap-and-add circuit.

2. The method of claim 1, wherein the first subset of the offsets comprise offsets that are less than or equal to an offset having a maximal correlation value and wherein the first edge offset is the first offset of the first subset that has a correlation value greater than or equal to the first predetermined threshold.

3. The method of claim 2 wherein the synchronization data frames comprise instances of a predetermined training sequence and wherein the transmitted instance arrives on a channel.

4. The method of claim 3, wherein the false alarm mitigation procedure comprises:

selecting the last offset of the set of potential second edge offsets if the last offset value minus first offset value of the set of potential second edge samples is less than or equal to a predetermined time value or if the number of offsets in the set of potential second edge offsets is greater than or equal to a predetermined offset count; and selecting the penultimate offset of the set of potential second edge offsets if the last offset value minus the first offset value of the set of potential second edge offsets is greater than the predetermined time value and the number of offsets in the set of potential second edge offsets is less than the predetermined offset count.

5. The method of claim 4, further comprising obtaining a channel estimation sequence and using the channel estimation sequence to determine if the channel is a fading channel; and decoding a subsequent data signal using the overlap and add circuit if the channel is a fading channel.

6. A data receiving apparatus, comprising:

a correlation module in communication with a receiver and configured to correlate a plurality of time domain samples of a data frame obtained from the receiver with an offset stored data frame to determine a plurality of magnitudes of correlation values corresponding to a corresponding plurality of time offsets; and an overlap and add circuit in communication with the receiver and the correlation module and configured to perform overlap and add on a data signal obtained from the receiver according to a determined overlap and add length and a determined time estimate;

wherein the determined overlap and add length comprises the distance between a first edge offset and a second edge offset;

wherein the first edge offset comprises an element of a first subset of the offsets whose correlation value magnitude is greater than or equal to a first predetermined threshold;

wherein the second edge offset comprises an element of a second subset of the offsets whose correlation value magnitude is greater than or equal to a second predetermined threshold; and wherein the determined time estimate comprises the time value of the first edge offset.

7. The apparatus of claim 6, wherein the first subset of the offsets comprise offsets that are less than or equal to the offset having a maximal correlation value magnitude and wherein the first edge offset is the first offset of the first subset having a correlation value magnitude greater than or equal to the first predetermined threshold.

8. The apparatus of claim 7, wherein the second subset of the offsets comprise offsets that are greater than or equal to the offsets having a maximal correlation value magnitude and wherein the second edge offset is the last offset of the second subset having a correlation value magnitude greater than or equal to a second predetermined threshold.

9. The apparatus of claim 8, wherein the first predetermined threshold equals the second predetermined threshold.

10. The apparatus of claim 7, wherein a set of potential second edge offsets comprises offsets of the second subset having correlation value magnitude greater than the second predetermined threshold and further comprising a false alarm mitigation module in communication with a correlation module configured to select the second edge offset from the set of potential second edge offsets using a false alarm mitigation procedure comprising:

selecting the last offset of the set of potential second edge offsets if the last offset value minus first offset value of the set of potential second edge samples is less than or equal to a predetermined time value or if the number of offsets in the set of potential second edge offsets is greater than or equal to a predetermined offset count; and selecting the penultimate offset of the set of potential second edge offsets if the last offset value minus the first offset value of the set of potential second edge offsets is greater than the predetermined time value and the number of offsets in the set of potential second edge offsets is less than the predetermined offset count.

11. The apparatus of claim 10, wherein the receiver receives data on a channel and further comprising a channel estimation module configured to determine if the channel is a fading channel and to bypass the overlap and add circuit if the channel is not a fading channel.

12. Computer executable program code embodied on a non-transitory computer readable medium configured to a receiver to perform the functions of:

obtaining a plurality of time domain samples of a transmitted instance of a synchronization data frame;

obtaining a coarse estimate of a starting value for the synchronization data frame;

correlating the time domain samples of the transmitted instance with a locally stored instance of the synchronization data frame at a plurality of time value offsets to determine a corresponding plurality of magnitudes of correlation values;

comparing the magnitudes of the correlation values corresponding to a first subset of the offsets to a first predetermined threshold to determine a first edge offset;

comparing the magnitudes of the correlation values corresponding to a second subset of the offsets to a second predetermined threshold to determine a set of potential second edge offsets;

selecting a second edge offset from the set of potential second edge offsets using a false alarm mitigation procedure;

using the first and second edge offsets to determine an overlap and add length estimate;

using the first edge offset to modify the coarse estimate of the starting value to determine an estimate of a starting position of a time-domain data window for subsequent processing by an overlap-and-add circuit; and providing the starting position estimate and the overlap and add length estimate to the overlap-and-add circuit.

13. The computer executable program code of claim 12, wherein the first subset of the offsets comprise offsets that are less than or equal to an offset having a maximal correlation value and wherein the first edge offset is the first offset of the first subset that has a correlation value greater than or equal to the first predetermined threshold.

14. The computer executable program code of claim 13 wherein the synchronization data frames comprise instances of a predetermined training sequence and wherein the transmitted instance arrives on a channel.

15. The computer executable program code of claim 14, wherein the false alarm mitigation procedure comprises:

selecting the last offset of the set of potential second edge offsets if the last offset value minus first offset value of the set of potential second edge samples is less than or equal to a predetermined time value or if the number of offsets in the set of potential second edge offsets is greater than or equal to a predetermined offset count; and selecting the penultimate offset of the set of potential second edge offsets if the last offset value minus the first offset value of the set of potential second edge offsets is greater than the predetermined time value and the number of offsets in the set of potential second edge offsets is less than the predetermined offset count.

16. The computer executable program code of claim 15, further configured to perform the functions of obtaining a channel estimation sequence and using the channel estimation sequence to determine if the channel is a fading channel; and decoding a subsequent data signal using the overlap and add circuit if the channel is a fading channel.

* * * * *